Dec. 16, 1930.  F. C. MORRIS  1,784,994
BRAKE LINING
Filed Oct. 5, 1928  2 Sheets-Sheet 1

Inventor
Fred C. Morris

By Starnes, Dickey & Pierce
Attorneys

Dec. 16, 1930.     F. C. MORRIS     1,784,994

BRAKE LINING

Filed Oct. 5, 1928     2 Sheets-Sheet 2

INVENTOR.
Fred C. Morris
BY
Harness, Dickey & Pierce
ATTORNEYS

Patented Dec. 16, 1930

1,784,994

UNITED STATES PATENT OFFICE

FRED C. MORRIS, OF SAN FRANCISCO, CALIFORNIA

BRAKE LINING

Application filed October 5, 1928. Serial No. 310,471.

This invention relates to brake mechanism, and particularly to the brake lining and mounting for the same, the principal object being the provision of means for mounting the linings of brakes whereby to increase the efficiency of the brakes and prevent squeaking, chattering and grabbing of the brakes.

Another object is to provide a brake shoe or brake band having a brake or friction lining and in which a strip of resilient material separates the lining from its band or shoe.

Another object is to provide a resilient cushion for the lining of a brake.

The above being among the objects of the present invention, the same consists in certain features of construction and combinations of parts to be hereinafter described with reference to the accompanying drawings, and then claimed, having the above and other objects in view.

In the accompanying drawings,—

In brake mechanisms, and particularly those employed in connection with motor vehicles and especially such vehicles equipped with four-wheel brakes, a great deal of annoyance has arisen in recent years due to the squeaking, chattering and grabbing of the brakes. Grabbing of the brakes may usually be remedied by properly adjusting the brake shoes or bands, but squeaking and chattering have usually been found very much more difficult to correct. Squeaking of the brakes has become particularly common and the cause for the same may be attributed to several different reasons among which are scored drums, particles of hard matter becoming embedded in the lining, high spots on the lining, and so forth. I have previously discovered that when brakes squeak, the squeak could be eliminated by the insertion of a small strip of rubber between the brake band and its lining or shoe at the point where the lining first contacted with the drum as the brake was being applied, and such pad is the subject matter of my United States Letters Patent No. 1,470,864 issued October 16, 1923. Since that time I have discovered that by separating the entire brake lining from the shoe or band by a strip of material having suitable resilient properties, squeaking, grabbing, and chattering of the brake will never appear in the same, and the life of the lining will be increased a material amount over conventional constructions in which the lining is directly connected without the interposition of such resilient strip.

The exact nature of the strip of resilient material which may be employed to separate the friction lining from its supporting member may vary between relatively wide limits so long as it has sufficient body to withstand the pressures and heat to which it may be subjected in service, and in the accompanying drawings I show various modifications which I have found may be employed with satisfactory results.

It will be apparent from the following description that the particular brake construction is immaterial inasmuch as in any case, whether the brake be internal or external, and whether it be of the band or shoe type employed either externally or internally, the construction disclosed will be equally applicable to any of the types.

Figure 1:
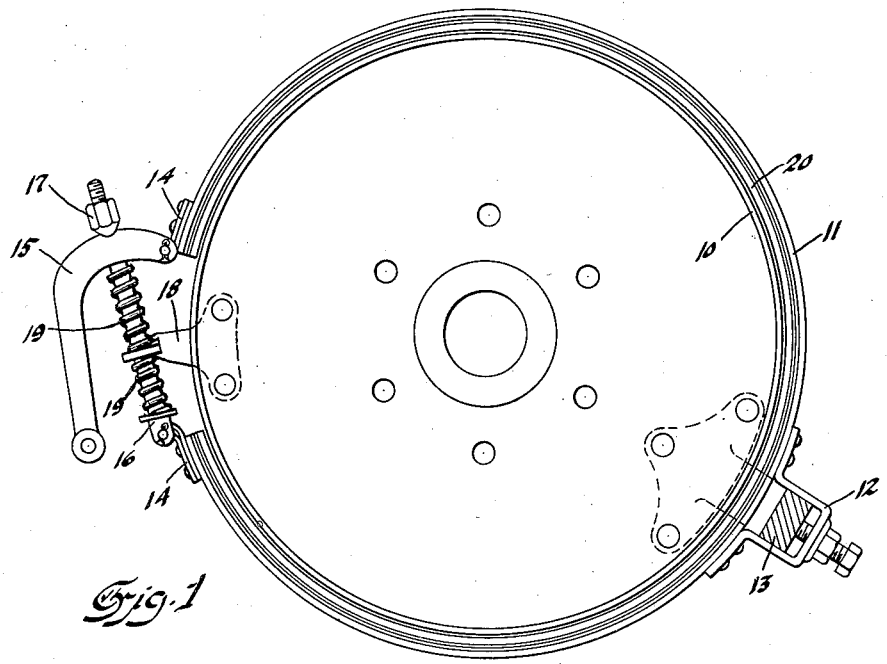
Fig. 1 is a side view of an external contracting brake band shown in operative position with respect to a brake drum.

Referring to Fig. 1 I show a band brake of the externally contracting type. As shown in that figure, the brake drum 10 is surrounded by a flexible split band 11 which is supported approximately opposite the split through a bracket 12 by a member 13 which may be suitably secured to a supporting member such as a dust cover, not shown, as in conventional constructions. The free ends of the band 11 are provided with members 14 formed with eyes and to one of which is pivotally connected the arm 15 and to the other end of which is pivotally connected the rod 16, the rod 16 projecting through the arm 15 near its point of pivot and being provided with an adjusting nut 17 thereon as in conventional constructions. The free ends of the band are supported relative to the drum 10 through the arm 15 and rod 16 by means of a bracket 18 suitably secured to a supporting surface and encircling the rod 16 between its point of pivot and the arm 15, suitable springs 19 encircling the rod 16 on each side of the support 18 constantly urging the ends of the band outwardly with respect to the drum. The brake or friction lining 20 is shown as being separated from the band 11 by the same strip of material as is employed in connection with the construction shown in Fig. 2 which is spaced in its entirety from the method of securing the lining 20 to the band 11 may take any desirable form of such as rivets, as in conventional constructions.

Figure 2:
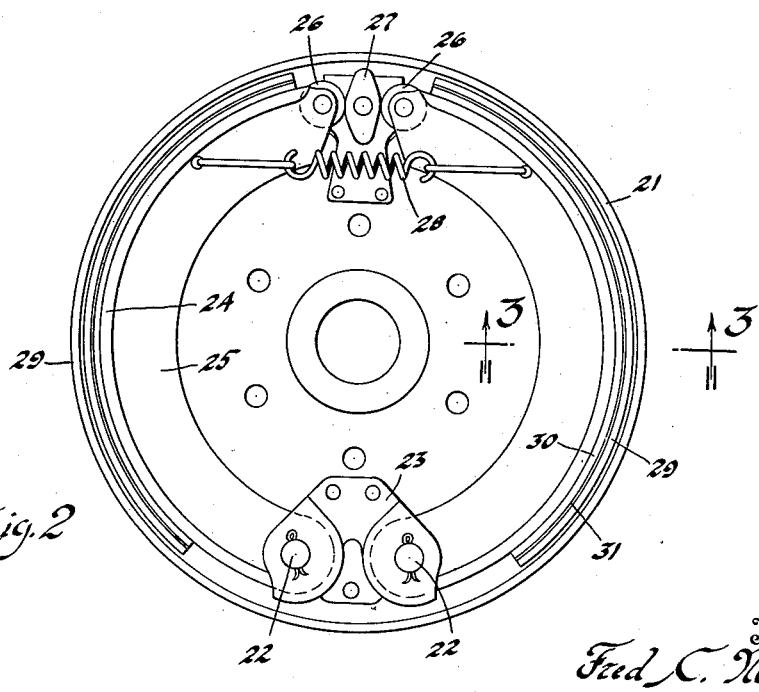
Fig. 2 is a side view of a brake drum provided with internal expanding brake shoes.

In Fig. 2 is shown a brake drum 21 within which is pivotally supported on the pins 22 carried by the bracket 23 a pair of brake shoes of each of which is provided with a similarly shaped face flange portion 24 and radially extending stiffening flange or web 25. The free ends of the shoes are provided with rollers 26 which are constantly urged into contact with the expanding cam 27 by means of the coil spring 28. The shoes are each provided with a brake or friction lining 29 which is spaced in its entirety from the corresponding shoe by means best shown in Fig. 3.

Figure 3:
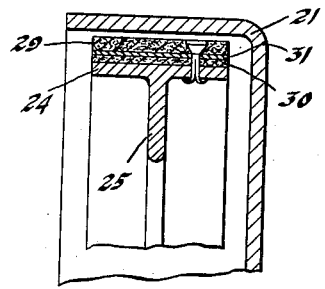
Fig. 3 is a sectional view taken on the line 3—3 of Fig. 2.

As indicated in Fig. 3 the lining 29 is separated from the face of the flange 24 by means of a strip of rubber 30. The strip 30 has vulcanized thereto a thin strip of brass or other suitable metal 31, and the outer face of the metal strip 31 is preferably "frictioned", that is, provided with a thin coating of rubber, so as to give it a frictional surface for contact with the lining 29. The rubber strip 30 is of sufficient thickness to resiliently support the lining 29 on the flange 24, and the metal strip 31 is provided for the purpose of preventing stretching of the rubber 30 so as to prevent it from working or creeping in service and becoming displaced from its intended position. For this reason the metal strip 31 may be made of very thin material readily flexible and relatively economical to include, although it will of course be apparent that it may be dispensed with where it is found that such working of the rubber does not, in fact, occur.

The rubber strip 30 is preferably compounded with a sufficient amount of asbestos or other material so as to impart to the rubber strip 30 the ability to withstand relatively high heats without disintegration or other ill effects.

Figure 4:
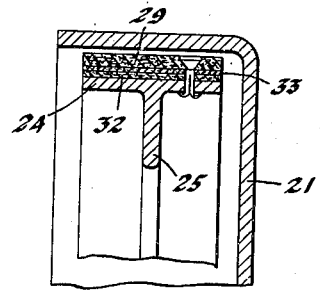
Fig. 4 is a fragmentary side view of a brake shoe provided with a modified mounting for the brake lining.

The construction shown in Fig. 3 may be varied as indicated in Fig. 4 wherein the resilient strip shown in Fig. 3 is replaced by a strip of rubber 32 vulcanized to a strip of fabric 33, such as duck, the surface of the fabric 33 which is adapted to contact with the lining 29 being preferably frictioned by the application of a small amount of rubber, as in the case of the metal strip 31. It will, of course, be evident that the strip of fabric 33 as well as the metal strip 31 may be positioned in contact with the face of the flange 24 instead of in contact with the lining 29 without affecting the action of the resilient member in any respect whatsoever.

Figure 5:
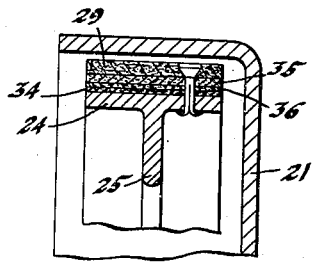
Fig. 5 is a fragmentary side view of another modified mounting for the brake lining.
Figure 6:
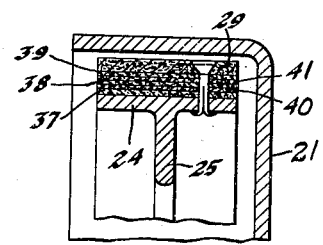
Fig. 6 is a fragmentary side view of another modified mounting for the brake lining.

The construction shown in Fig. 4 may be varied as indicated in Fig. 5 in which the resilient strip is made of a pair of rubber strips 34 and 35 separated by and vulcanized to a fabric strip 36, and this modification may be carried still further as indicated in Fig. 6 in which three layers of rubber 37, 38 and 39 are employed and in which the layers 37 and 38 are separated by and vulcanized to a strip of fabric 40, and the layers 38 and 39 are separated by and vulcanized to a strip of fabric 41.

Figure 7:
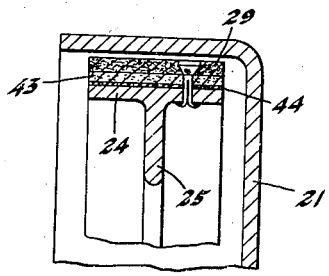
Fig. 7 is a fragmentary side view of another modified mounting for the brake lining.

It may be desirable in some cases to integrally unite the combination rubber and metallic strip to the shoe itself as indicated in Fig. 7. When this method is employed it is preferable to provide the face of the shoe to which the rubber is vulcanized with a thin coating of metal 44, which simulates the strip 31 previously described, and to which the rubber may be readily vulcanized, the coating 44 being applied to the face of the flange 24 by an electro-plating process or other suitable means.

Figure 8:
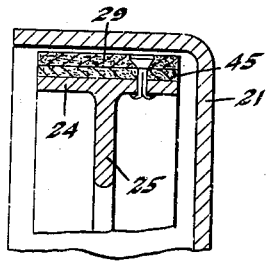
Fig. 8 is a fragmentary side view of another modified mounting for the brake lining.

Another form of the present invention is indicated in Fig. 8 in which the resilient strip 45 is made up of a layer of fabric sufficiently impregnated with rubber to impart to it the necessary resilient qualities. This layer 45 may be secured in place either as a separate strip or vulcanized to the lining or shoe, as deemed desirable, as will be apparent is possible with any of the above described constructions.

Figure 9:
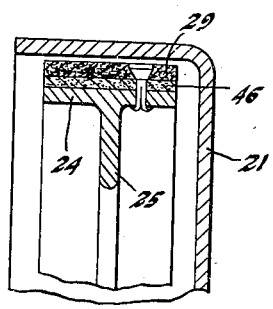
Fig. 9 is a fragmentary side view of another modified mounting for the brake lining.

In some cases a fabric having the necessary resilient qualities without the necessity of the addition of rubber thereto may be employed as the strip and this is indicated in Fig. 9 in which the lining 29 is separated from the face of the flange 24 by a strip of fabric 46 having the desired resilient qualities. It will be apparent of course that such strip 46 must be of a softer nature than the lining 29 which, in accordance with the present day standards, is of relatively hard construction.

Figure 10:
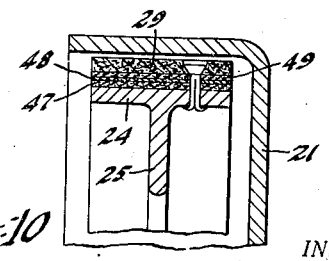
Fig. 10 is a fragmentary side view of another modified mounting for the brake lining.

In some cases it may be desirable to combine the metal, fabric and rubber to form the resilient strip and such construction is indicated in Fig. 10 in which the lining 29 is separated from the flange 24 by a strip comprising a layer of rubber 47 vulcanized to a strip of metal 48 which in turn has vulcanized thereto a strip of fabric 49 the surface of which is suitably frictioned as previously described in connection with some of the forms set forth above.

It will be apparent from the foregoing that the particular construction of the resilient strip employed for separating the brake lining from its supporting member, whether it be a shoe or band, is relatively immaterial so long as such strip has suitable resilient qualities and is maintained against stretching, and it is also obvious that it may be applied either as a separate strip or as an integral part of the shoe or of the lining without affecting the results desired to be produced.

Formal changes may be made in the specific embodiment of the invention described without departing from the spirit or substance of the broad invention the scope of which is commensurate with the appended claims.

What I claim is:

1. In combination, a brake element provided with a supporting surface, a brake lining for said surface, and a strip of material separating said lining from said surface, said strip comprising a relatively non-stretchable element and a resilient element integrally secured together.

2. In combination, a brake element provided with a supporting surface, and a brake lining secured to said surface in generally spaced relationship by a spacer member, said member comprising a strip of material substantially co-extensive with said lining and composed of a resilient material united with a shape maintaining member.

3. In combination, a brake element provided with a supporting surface, and a brake lining secured to said surface in generally spaced relationship by a spacer member, said member comprising a strip of material substantially co-extensive with said lining and composed of a layer of rubber and a layer of metal.

4. In combination, a brake element provided with a supporting surface, a brake lining for said surface, and a cushion member for spacing said lining from said surface, said cushion member comprising a strip of material substantially co-extensive with said lining and formed of a layer of resilient material and a cooperating layer of substantially non-stretchable material.

5. In combination, a brake element provided with a supporting surface, a brake lining for said surface, and means for spacing said lining from said surface comprising a layer of stretchable resilient material maintained against stretching by a cooperating layer of non-stretchable material, said layers being substantially co-extensive with said lining.

6. A cushion support for a brake lining comprising, in combination, a strip substantially co-extensive with said brake lining and comprising a layer of relatively stretchable resilient material and a cooperating layer of relatively non-stretchable material.

7. A cushion support for a brake lining comprising, in combination, a strip substantially co-extensive with said brake lining and comprising a layer of relatively stretchable resilient material and a cooperating layer of relatively non-stretchable material integrally united therewith.

8. A cushion support for a brake lining comprising, in combination, a strip substantially co-extensive with said brake lining and comprising a layer of relatively stretchable resilient material and a cooperating layer of thin metal intimately secured thereto.

9. A cushion support for a brake lining comprising, in combination, a strip substantially co-extensive with said brake lining and comprising a layer of rubber and a cooperating layer of relatively non-stretchable material.

10. A cushion support for a brake lining comprising, in combination, a strip substantially co-extensive with said brake lining and comprising a layer of rubber and a cooperating thin layer of metal intimately secured thereto.

11. A cushion support for a brake lining comprising, in combination, a strip substantially co-extensive with said brake lining and comprisng a layer of rubber and a cooperating thin layer of metal vulcanized thereto.

FRED C. MORRIS.